United States Patent
Dooley et al.

(10) Patent No.: US 11,350,810 B2
(45) Date of Patent: Jun. 7, 2022

(54) SYSTEM AND METHOD FOR AUTONOMOUS MOPPING OF A FLOOR SURFACE

(71) Applicant: iRobot Corporation, Bedford, MA (US)

(72) Inventors: Michael J. Dooley, Pasadena, CA (US); James Philip Case, Los Angeles, CA (US); Nikolai Romanov, Oak Park, CA (US)

(73) Assignee: iRobot Corporation, Bedford, MA (US)

( * ) Notice: Subject to any disclaimer, the term of this patent is extended or adjusted under 35 U.S.C. 154(b) by 313 days.

(21) Appl. No.: 16/382,864

(22) Filed: Apr. 12, 2019

(65) Prior Publication Data

US 2019/0231163 A1 Aug. 1, 2019

Related U.S. Application Data

(60) Continuation of application No. 15/726,536, filed on Oct. 6, 2017, now Pat. No. 10,258,214, which is a
(Continued)

(51) Int. Cl.
*G05D 1/00* (2006.01)
*A47L 11/40* (2006.01)
(Continued)

(52) U.S. Cl.
CPC ........... *A47L 11/4011* (2013.01); *A47L 11/30* (2013.01); *A47L 11/4036* (2013.01);
(Continued)

(58) Field of Classification Search
CPC .. A47L 11/4011; A47L 11/30; A47L 11/4036; A47L 11/4088; A47L 2201/04;
(Continued)

(56) References Cited

U.S. PATENT DOCUMENTS

| 5,440,216 A | 8/1995 | Kim |
| 5,720,077 A | 2/1998 | Nakamuta et al. |

(Continued)

FOREIGN PATENT DOCUMENTS

| DE | 10 2009 041 362 | * 11/2009 | ............... A47L 9/28 |
| WO | 01/91623 | 12/2001 | |
| WO | 01/91624 | 12/2001 | |

OTHER PUBLICATIONS

European Patent Office; Notification of Transmittal of the International Search Report and the Written opinion of the International Searching Authority, or the Declaration, the International Search Report, and the Written Opinion of the International Searching Authority; Sep. 10, 2009; Riiswiik, The Netherlands, from PCT/US2009/041728.
(Continued)

*Primary Examiner* — Ian Jen
(74) *Attorney, Agent, or Firm* — Fish & Richardson P.C.

(57) ABSTRACT

A mobile robot configured to travel across a residential floor or other surface while cleaning the surface with a cleaning pad and cleaning solvent is disclosed. The robot includes a controller for managing the movement of the robot as well as the treatment of the surface with a cleaning solvent. The movement of the robot can be characterized by a class of trajectories that achieve effective cleaning. The trajectories include sequences of steps that are repeated, the sequences including forward and backward motion and optional left and right motion along arcuate paths.

19 Claims, 7 Drawing Sheets

Related U.S. Application Data continuation of application No. 15/175,328, filed on Jun. 7, 2016, now Pat. No. 9,801,518, which is a continuation of application No. 14/877,207, filed on Oct. 7, 2015, now Pat. No. 9,370,290, which is a continuation of application No. 14/522,446, filed on Oct. 23, 2014, now Pat. No. 9,167,947, which is a division of application No. 12/928,965, filed on Dec. 23, 2010, now Pat. No. 8,892,251.

(60) Provisional application No. 61/292,753, filed on Jan. 6, 2010.

(51) Int. Cl.
  *G05D 1/02* (2020.01)
  *A47L 11/30* (2006.01)
  *B25J 11/00* (2006.01)

(52) U.S. Cl.
  CPC ....... *A47L 11/4061* (2013.01); *A47L 11/4066* (2013.01); *A47L 11/4088* (2013.01); *B25J 11/0085* (2013.01); *G05D 1/021* (2013.01); *G05D 1/0212* (2013.01); *G05D 1/0219* (2013.01); *A47L 2201/04* (2013.01); *G05B 2219/39219* (2013.01); *G05D 2201/0203* (2013.01)

(58) Field of Classification Search
  CPC ............... B25J 11/0085; G05D 1/0219; G05D 2201/0203
  See application file for complete search history.

(56) References Cited

U.S. PATENT DOCUMENTS

| | | | |
|---|---|---|---|
| 5,815,880 A | | 10/1998 | Nakanishi |
| 5,841,259 A | | 11/1998 | Kim et al. |
| 5,894,621 A | | 4/1999 | Kubo |
| 5,940,927 A | | 8/1999 | Haegermarck et al. |
| 5,959,423 A | | 9/1999 | Nakanishi et al. |
| 5,991,951 A | | 11/1999 | Kubo et al. |
| 5,998,953 A | | 12/1999 | Nakamura et al. |
| 6,012,618 A | | 1/2000 | Matsuo |
| 6,076,025 A | | 6/2000 | Ueno et al. |
| 6,119,057 A | | 9/2000 | Kawagoe |
| 6,142,252 A | | 11/2000 | Kinta et al. |
| 6,278,917 B1 * | | 8/2001 | Bauer ............. G05D 1/0225 180/168 |
| 6,299,699 B1 | | 10/2001 | Porat et al. |
| 6,327,741 B1 | | 12/2001 | Reed |
| 6,338,013 B1 | | 1/2002 | Ruffner |
| 6,459,955 B1 | | 10/2002 | Bartsch et al. |
| 6,463,368 B1 * | | 10/2002 | Feiten ............. G05D 1/0227 701/23 |
| 6,481,515 B1 | | 11/2002 | Kirkpatrick et al. |
| 6,580,246 B2 | | 6/2003 | Jacobs |
| 6,741,054 B2 | | 5/2004 | Koselka et al. |
| 6,742,613 B2 | | 6/2004 | Erlich et al. |
| 6,771,217 B1 | | 8/2004 | Liu et al. |
| 6,779,217 B2 | | 8/2004 | Fisher |
| 6,901,624 B2 | | 6/2005 | Mori et al. |
| 6,938,298 B2 | | 9/2005 | Aasen |
| 7,013,528 B2 | | 3/2006 | Parker et al. |
| 7,015,831 B2 | | 3/2006 | Karlsson et al. |
| 7,113,847 B2 | | 9/2006 | Chmura et al. |
| 7,135,992 B2 | | 11/2006 | Karlsson et al. |
| 7,145,478 B2 | | 12/2006 | Goncalves et al. |
| 7,162,338 B2 | | 1/2007 | Goncalves et al. |
| 7,177,737 B2 | | 2/2007 | Karlsson et al. |
| RE39,581 E | | 4/2007 | Stuchlik et al. |
| 7,225,552 B2 | | 6/2007 | Kwon et al. |
| 7,272,467 B2 | | 9/2007 | Goncalves et al. |
| 7,320,149 B1 | | 1/2008 | Huffman et al. |
| 7,346,428 B1 | | 3/2008 | Huffman et al. |
| 7,480,958 B2 | | 1/2009 | Song et al. |
| 7,720,554 B2 | | 5/2010 | DiBernardo et al. |
| 7,827,643 B2 | | 11/2010 | Erlich et al. |
| 8,380,350 B2 | | 2/2013 | Ozick et al. |
| 8,452,450 B2 * | | 5/2013 | Dooley ............. B60L 53/14 901/46 |
| 8,892,251 B1 | | 11/2014 | Dooley et al. |
| 9,167,947 B2 | | 10/2015 | Dooley et al. |
| 9,179,813 B2 | | 11/2015 | Dooley et al. |
| 9,370,290 B2 | | 6/2016 | Dooley et al. |
| 9,725,012 B2 | | 8/2017 | Romanov et al. |
| 9,725,013 B2 | | 8/2017 | Romanov et al. |
| 9,801,518 B2 | | 10/2017 | Dooley |
| 10,258,214 B2 | | 4/2019 | Dooley et al. |
| 2002/0002751 A1 | | 1/2002 | Fisher |
| 2002/0011813 A1 | | 1/2002 | Koselka et al. |
| 2002/0175648 A1 | | 11/2002 | Erko et al. |
| 2003/0229421 A1 | | 12/2003 | Chmura et al. |
| 2004/0031113 A1 | | 2/2004 | Wosewick et al. |
| 2004/0143930 A1 | | 7/2004 | Haegermarck |
| 2004/0244138 A1 | | 12/2004 | Taylor et al. |
| 2005/0209736 A1 | | 9/2005 | Kawagoe |
| 2005/0217061 A1 | | 10/2005 | Reindle |
| 2005/0229340 A1 | | 10/2005 | Sawalski et al. |
| 2005/0278888 A1 * | | 12/2005 | Reindle ............. A47L 9/2857 15/319 |
| 2006/0085095 A1 * | | 4/2006 | Reindie ............. A47L 9/2821 700/258 |
| 2006/0288519 A1 * | | 12/2006 | Jaworski ............. A47L 11/4036 15/340.1 |
| 2006/0293794 A1 * | | 12/2006 | Harwig ............. G05D 1/0261 180/23 |
| 2006/0293809 A1 * | | 12/2006 | Harwig ............. G05D 1/0272 701/26 |
| 2007/0061040 A1 | | 3/2007 | Augenbraun et al. |
| 2008/0104783 A1 | | 5/2008 | Crawford et al. |
| 2008/0155768 A1 | | 7/2008 | Ziegler et al. |
| 2009/0133720 A1 | | 5/2009 | Van Den Bogert |
| 2009/0281661 A1 * | | 11/2009 | Dooley ............. B60L 50/52 700/258 |
| 2010/0198443 A1 | | 8/2010 | Yabushita et al. |
| 2010/0235033 A1 | | 9/2010 | Yamamoto et al. |
| 2010/0241289 A1 | | 9/2010 | Sandberg |
| 2011/0202175 A1 * | | 8/2011 | Romanov ............. B25J 5/00 700/250 |
| 2015/0040332 A1 | | 2/2015 | Dooley et al. |
| 2015/0046016 A1 | | 2/2015 | Dooley et al. |
| 2015/0157182 A1 | | 6/2015 | Noh |
| 2016/0022109 A1 | | 1/2016 | Dooley et al. |
| 2016/0353960 A1 | | 12/2016 | Dooley et al. |
| 2018/0092500 A1 | | 4/2018 | Dooley et al. |

OTHER PUBLICATIONS

THE International Bureau of WIPO; Notification Concerning Transmittal of International Preliminary Report on Patentability, International Preliminary Report on Patentability, and Written Opinion of the International Searching Authority; Nov. 4, 2010; Geneva, Switzerland, from PCT/US2009/041728.

\* cited by examiner

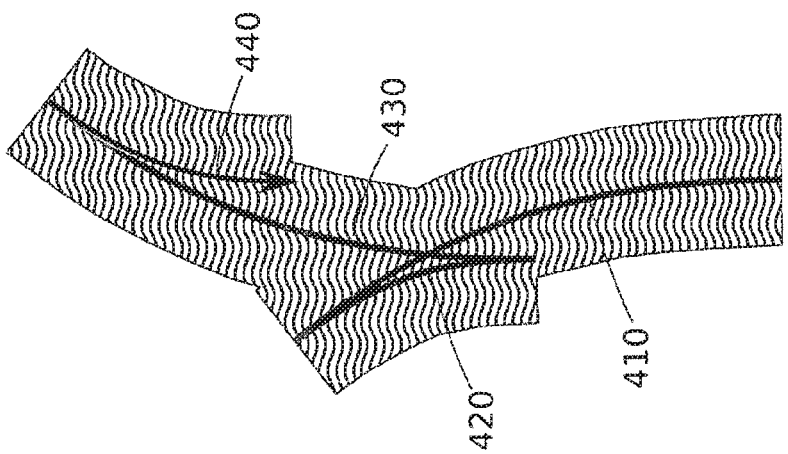
Fig. 4A
Fig. 4B
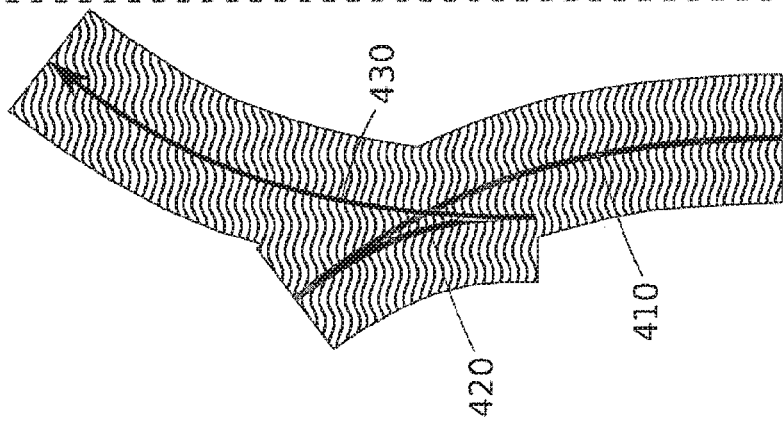
Fig. 4C
Fig. 4D

4) Back-left

3) Forward-right

2) Back-right

1) Forward-left

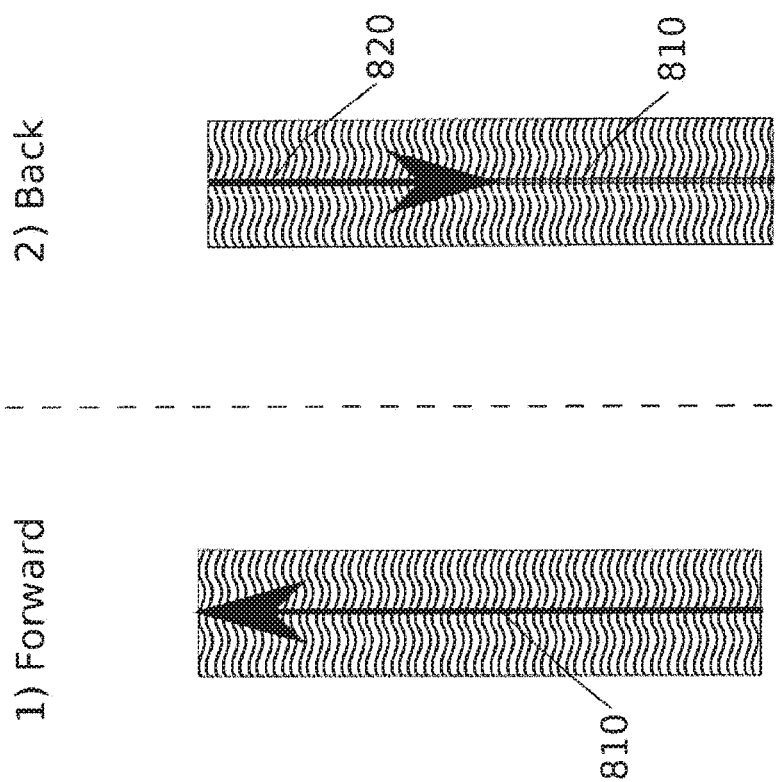

SYSTEM AND METHOD FOR AUTONOMOUS MOPPING OF A FLOOR SURFACE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The invention pertains to a mobile robot for cleaning a floor or other surface. In particular, the invention pertains to a robot configured to implement a class of trajectories designed to efficiently scrub or otherwise clean the floor.

BACKGROUND

From their inception, robots have been designed to perform tasks that people prefer not to do or cannot do safely. Cleaning and vacuuming, for example, are just the type of jobs that people would like to delegate to such mechanical helpers. The challenge, however, has been to design robots that can clean the floor of a home well enough to satisfy the exacting standards of the people the live in it. Although robots have been designed to vacuum floors, robots designed to perform mopping present unique challenges. In particular, such a robot should be able to dispense cleaning solution, scrub the floor with the solution, and then effectively remove the spent cleaning solution. Robots tend to perform unsatisfactorily, however, because hard deposits on the floor may require time for the cleaning solution to penetrate and removal of the dirty solution may leave streak marks on the floor. There is therefore a need for a cleaning robot able to implement a cleaning plan that enables the robot to apply cleaning solution, repeatedly scrub the floor with the solution, and leave the floor free of streak marks.

SUMMARY

The present invention pertains to a mobile robot configured to travel across a residential floor or other surface while cleaning the surface with a cleaning pad and cleaning solvent. The robot includes a controller for managing the movement of the robot as well as the treatment of the surface with a cleaning solvent. The movement of the robot can be characterized by a class of trajectories that achieve effective cleaning. These trajectories seek to: maximize usage of the cleaning solvent, reduce streaking, utilize absorption properties of the pad, and use as much of the surface of the pad as possible. In an exemplary embodiment, the trajectory may include an oscillatory motion with a bias in a forward direction by repeatedly moving forward a greater distance than backward. In the same exemplary embodiment, the cleaning pad is a disposable sheet impregnated with solvent that is then applied to and recovered from the surface by means of the trajectory.

In one embodiment, the cleaning robot includes a cleaning assembly; a path planner for generating a cleaning trajectory; and a drive system for moving the robot in accordance with the cleaning trajectory. The cleaning trajectory is a sequence of steps or motions that are repeated a plurality times in a prescribed order to effectively scrub the floor. Repetition of the sequence, in combination with the forward and back motion, causes the cleaning assembly to pass of areas of the floor a plurality of times while allowing time for the cleaning solution to penetrate dirt deposits.

The sequence repeated by the cleaning trajectory preferably comprises: (i) a first path for guiding the robot forward and to the left; (ii) a second path for guiding the robot backward and to the right; (iii) a third path for guiding the robot forward and to the right; and (iv) a fourth path for guiding the robot backward and to the left. The first path and third path result in a longitudinal displacement of the robot (movement parallel to the direction of progression) referred to as a first distance forward, and the second path and fourth path result in a longitudinal displacement referred to as a second distance backward. The first distance is greater than the second distance, preferably twice as large. In addition, the second path results in a lateral displacement (movement perpendicular to the direction of progression) which is referred to as the third distance, and the fourth path moves the robot laterally by a fourth distance that is equal in magnitude but opposite in direction from the third distance. In the preferred embodiment, the first through fourth paths are arcuate paths.

BRIEF DESCRIPTION OF THE DRAWINGS

The present invention is illustrated by way of example and not limitation in the figures of the accompanying drawings, and in which:

FIGS. 4A-4D depict a sequence of steps that produce the trajectory of FIG. 3;

FIGS. 8A-8B depict a sequence of steps that produce the trajectory of FIG. 7.

DETAILED DESCRIPTION OF THE PREFERRED EMBODIMENT

Figure 1A:
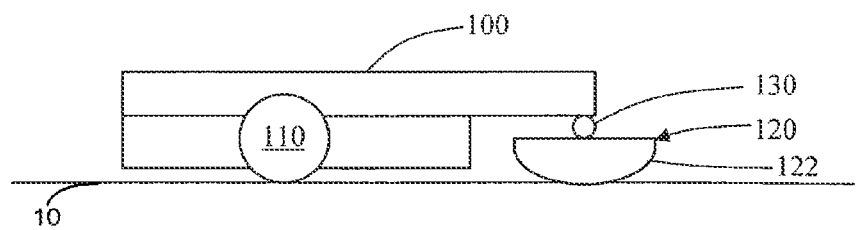
FIG. 1A is an autonomous mobile robot, in accordance with a preferred embodiment.

Illustrated in FIG. 1A is an autonomous mobile robot 100 configured to clean or otherwise treat a floor or other surface using a trajectory designed to repeatedly scrub the floor. In the preferred embodiment, the mobile robot 100 includes a housing with a controller and navigation system (not shown) for generating a path to clean the entire floor, a drive system 110 configured to move the robot around a room or other space e.g., space 10 in FIG. 1A) in a determined trajectory, and a cleaning assembly 120A pivotably attached to the robot housing by means of a hinge 130. The cleaning assembly 120A preferably includes a curved bottom surface 122 configured to press a cleaning sheet to the floor. The mobile robot in the preferred embodiment is based on the cleaning robot taught in pending U.S. patent application Ser. No. 12/429,963 filed on Apr. 24, 2009, which is hereby incorporated by reference herein.

The cleaning component in the preferred embodiment is configured to scrub the floor with a disposable cleaning sheet, preferably a wet cleaning sheet impregnated with cleaning solution. In other embodiments, the cleaning assembly is configured to dispense cleaning solution directly on the floor and then scrub the floor with a dry cleaning sheet. In still other embodiments, the cleaning assembly is configured to employ cleaning components for brushing, dusting, polishing, mopping, or vacuuming the floor, which may be a wood, tile, or carpet, for example.

Figure 2:
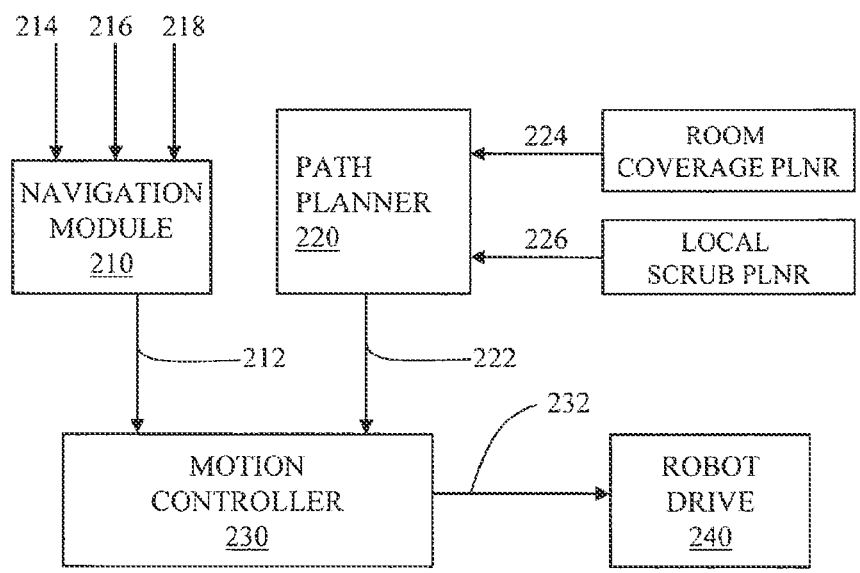
FIG. 2 is a schematic diagram of a navigation system, in accordance with a preferred embodiment.

Illustrated in FIG. 2 is a schematic diagram of the navigation system in the preferred embodiment. The navigation system 200 includes a navigation module 210 configured to maintain an estimate of the robot's current pose while it navigates around its environment, preferably an interior room bounded by walls. The pose 212, which includes both the position and orientation, is based on multiple sensor readings including wheel odometry 214 provided by encoders integrated into the wheels 110, orientation readings 216 from a gyroscope (not shown) on board the robot, and position coordinates from an optical sensor configured to sense light reflected from the room's ceiling. The optical sensor may include one or more photo diodes, one or more position sensitive detectors (PSDs), or one or more laser range finders, for example. The optical sensor employed in the preferred embodiment is taught in U.S. Pat. No. 7,720,554, which is hereby incorporated by reference herein.

The navigation system further includes a path planner 220 for generating or executing logic to traverse a desired trajectory or path 222 to scrub the entire floor with no gaps. In path 222 designed by the path planner 220 is a combination of a first trajectory from a room coverage planner 222 and a second trajectory from a local scrub planner 226, which are discussed in more detail below. Based on the current pose 212 and the desired path 222, the motion controller generates motion commands 232 for the robot drive 240. The commands in the preferred embodiment include the angular velocity for each of a pair of wheels 110, which are sufficient to control the speed and direction of the mobile robot. As the robot navigates through its environment, the navigation module 210 continually generates a current robot pose estimate while the path planner 220 updates the desired robot path.

The first trajectory is designed to guide the robot throughout the entire room until each section of the floor has been traversed. The second trajectory is a pattern including a plurality of incremental steps that drive the cleaning assembly both forward and backward, and optionally left and right. The first trajectory ensures every section of the floor is traversed with the cleaning assembly while the second trajectory ensures each section of floor traversed is effectively treated with cleaning solution and scrubbed with multiple passes of the cleaning assembly.

The first trajectory may take the form of any of a number of space-filling patterns intended to efficiently traverse each part of the room. For example, the first trajectory may be a rectilinear pattern in which the robot traverses the entire width of the room multiple times, each traversal of the room covering a unique swath or row adjacent to the prior row traversed. The pattern in repeated until the entire room is covered. In another embodiment, the robot follows a path around the contour of the room to complete a loop, then advances to an interior path just inside the path traversed in the preceding loop. Successively smaller looping patterns are traversed until the center of the room is reached. In still another embodiment, the robot traverses the room in one or more spiral patterns, each spiral including a series of substantially concentric circular or substantially square paths of different diameter. These and other cleaning contours are taught in U.S. patent application Ser. No. 12/429,963 filed on Apr. 24, 2009.

Figure 1B:
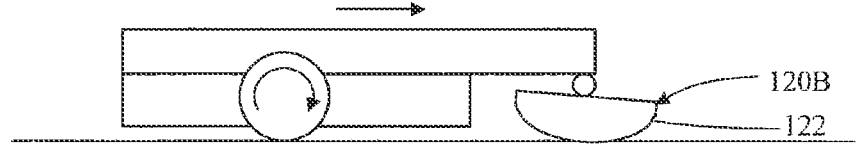
FIG. 1B is the autonomous mobile robot moving in the forward direction, in accordance with a preferred embodiment.
Figure 1C:
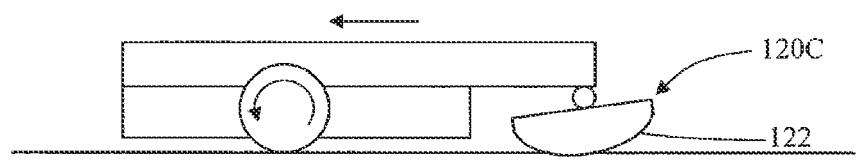
FIG. 1C is the autonomous mobile robot moving in the backward direction, in accordance with a preferred embodiment.

The second trajectory scrubs the floor using a combination of forward and backward motion. The step in the forward direction is generally larger than the step in the backward direction to produce a net forward movement. If the second trajectory includes lateral movement, the steps to the left and right are generally equal. The repeated forward/backward motion, in combination with hinge 130, causes the orientation of the cleaning assembly to oscillate between a small angle forward or a small angle backward as shown in FIGS. 1B and 1C, respectively. When driven in the forward direction, the cleaning assembly 120B pivots forward which presses the front half of the cleaning pad against the floor while lifting the back half away from the floor. When driven in the reverse direction, the cleaning assembly 120C pivots backward to press the back half of the cleaning pad against the floor while lifting the front half away from the floor. As a result, the front half of the cleaning sheet (1) scrubs the floor with the cleaning sheet impregnated with cleaning solution and (2) captures/collects dirt and debris as the robot advances in the forward direction (see FIG. 1B). On the other hand, the back half of the cleaning sheet, which remains generally free of debris, scrubs the floor with cleaning solution released from the cleaning sheet. This serves to: (i) evenly apply cleaning solution, (ii) recover the cleaning solution mixed with dissolved dirt, (iii) produce an elapse time between application and recovery of the cleaning solution, (iv) mechanically agitate the cleaning solution on the floor, and (v) produce little or no visible streak marks on the floor. In the exemplary embodiment, the cleaning sheet is impregnated with a cleaning solution that is transferred to the floor by contact. In another embodiment the mobile robot includes a reservoir with at least one nozzle configured to either spray cleaning solution on the floor surface in front of the cleaning assembly or diffuse the cleaning solution directly into the upper surface of the sheet through capillary action.

Figure 3:
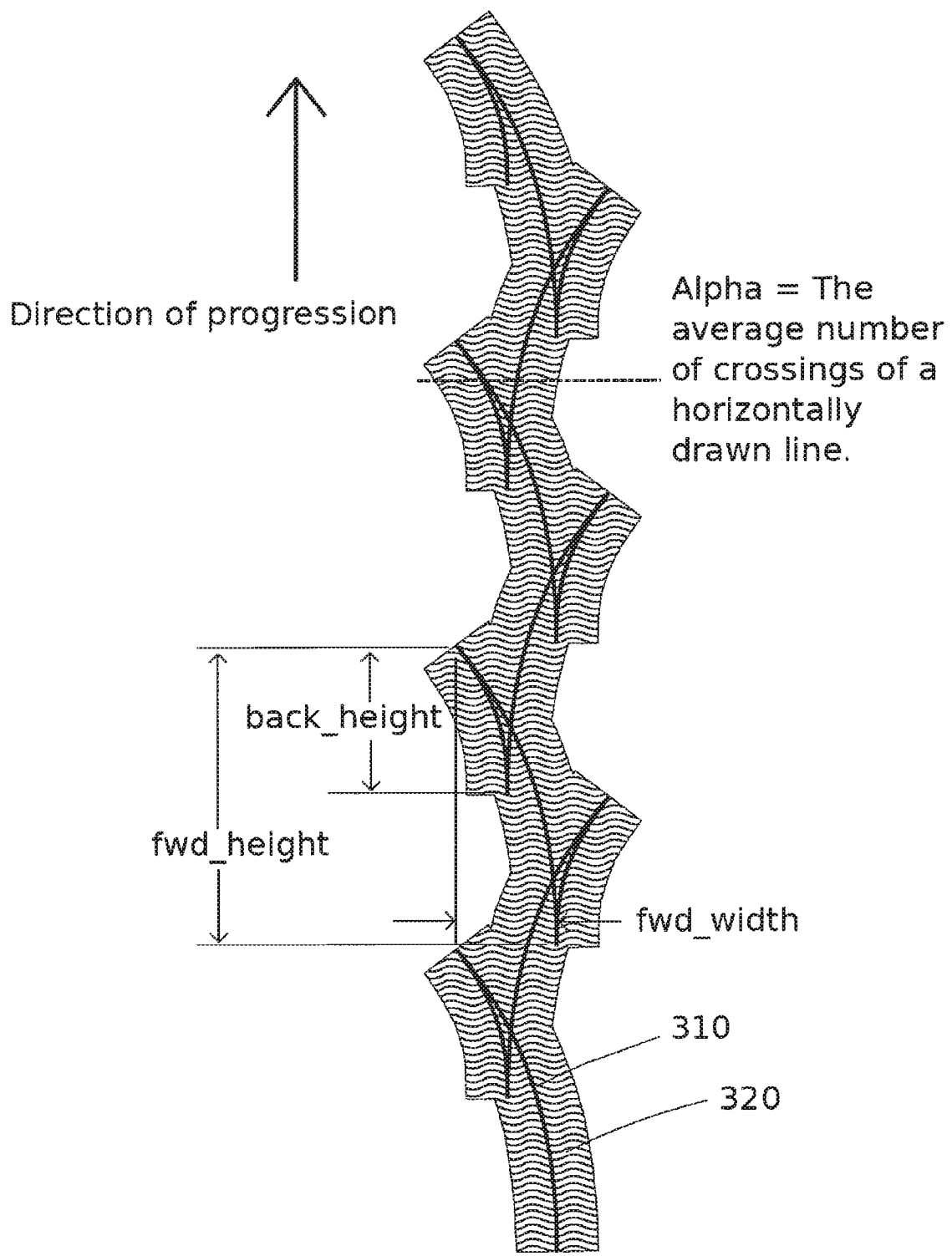
FIG. 3 is a cleaning trajectory for scrubbing a floor, in accordance with an exemplary embodiment.

Illustrated in FIG. 3 is an example of a second trajectory for scrubbing a floor. The trajectory is produced by repetition of the sequence of steps shown in FIGS. 4A-4D. The solid line 310 represents the path traced by the midpoint of the leading edge of the cleaning assembly 120 while the shaded region 320 represents the region of floor scrubbed by the cleaning assembly. When this sequence is employed, the robotic cleaner oscillates in the forward direction of motion as well as laterally. For each oscillation, the forward displacement (defined as the "fwd_height") exceeds the backward displacement (defined as the "back_height") so the robot advances in a generally forward direction (defined as the "direction of progression"). The robot also moves left and right equal amounts (defined as the fwd_width) which causes the robot to travel in a generally straight line.

The trajectory shown in trajectory in FIG. 3 is produced by repetition of the sequence of steps illustrated in FIG. 4A-4D in the prescribed order. Each step or leg comprises a motion with an arcuate path. The first leg 410 of the sequence shown in FIG. 4A advances the robot forward by fwd_height and to the left. In the second leg 420 shown in FIG. 4B, the robot moves backward by back_height and to the right. In the third leg 430 shown in FIG. 4C, the robot moves forward by fwd_height and to the right. In the fourth leg 440 shown in FIG. 4D, the robot moves backward by back_height and to the left. The forward arcing motions have a larger radius than the back motions such that the robot is oriented parallel to the direction of progression upon completion of the backward motion.

Trajectories that include arced or arcuate paths can provide several benefits over trajectories having only straight paths. For example, the trajectory shown in FIG. 3, which consists of arcuate paths, causes the robot to continually turn or rotate while in motion. This rotation, in turn is detected by the on-board gyroscope and monitored by the navigation system for purposes of detecting slippage of the wheels 110. When the detected rotation is different than the rotation associated with the curvature of the path, the robot can confirm slippage due to loss of traction, for example, and correct the robots course accordingly. In contrast, trajectories with straight paths make it difficult to detect slippage when, for example, both wheels slip at the same rate which cannot be detect with the gyro.

For the trajectory shown in FIGS. 3 and 4A-4D, the parameters are as follows:

(a) fwd_height: the distance traveled in the direction of progression on the forward legs or strokes has a value of approximately 1.5 times with width of the cleaning assembly 120, the width being measured in the direction perpendicular to the direction of progression;

(b) back_height: the distance traveled in the direction opposite the direction of progression on the backward legs or strokes has a value of approximately 0.75 times the width of the cleaning assembly 120; and (c) fwd_width: the distance traveled orthogonal to the direction of progression on the forward legs or strokes has a value of approximately 0.3 times the width of the cleaning assembly 120.

In general, however, fwd_height may range between one and five times the width of the cleaning assembly 120, the back_height may range between one third and four times the width of the cleaning assembly 120, and the elapse time of a cleaning single sequence may range between five second and sixty seconds.

Where the cleaning sheet is a Swiffer® Wet Cleaning Pad, for example, each sequence of the trajectory is completed in a time between 15 to 30 seconds, which enables the cleaning solution to remain on the floor long enough to dissolve dirt but not so long that it first evaporates.

Figure 5:
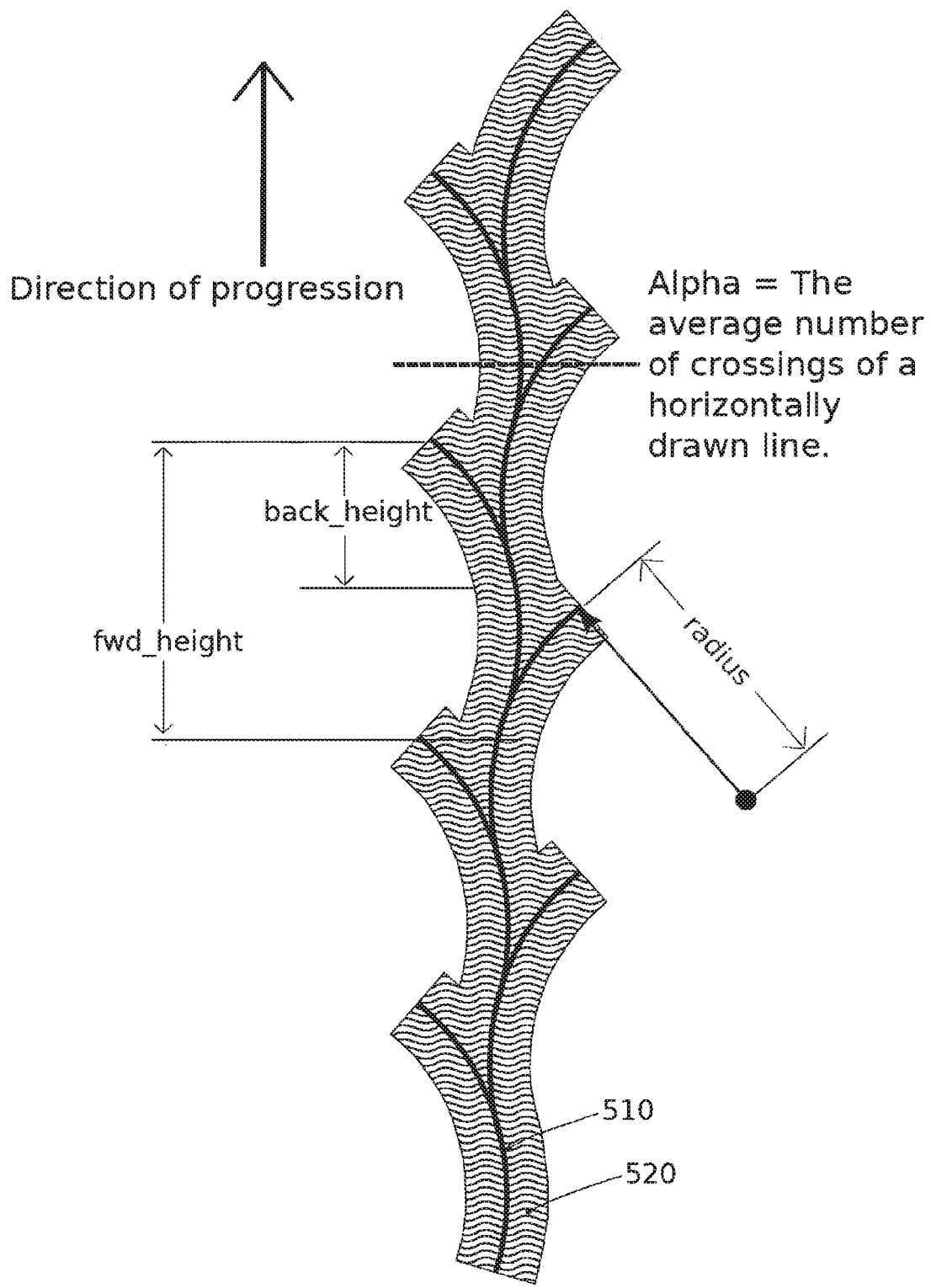
FIG. 5 is a cleaning trajectory for scrubbing a floor, in accordance with another exemplary embodiment.
Figure 6D:
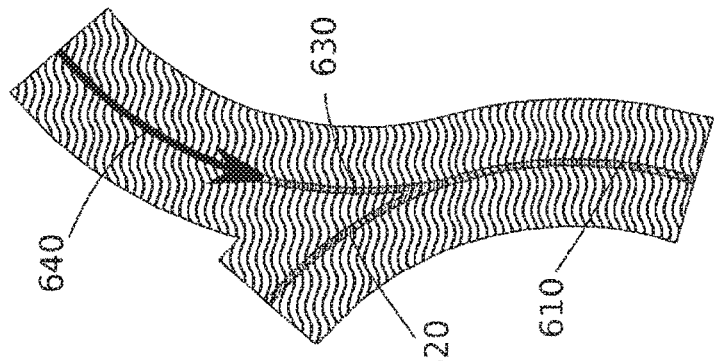
FIGS. 6A-6D depict a sequence of steps that produce the trajectory of FIG. 5.
Figure 6C:
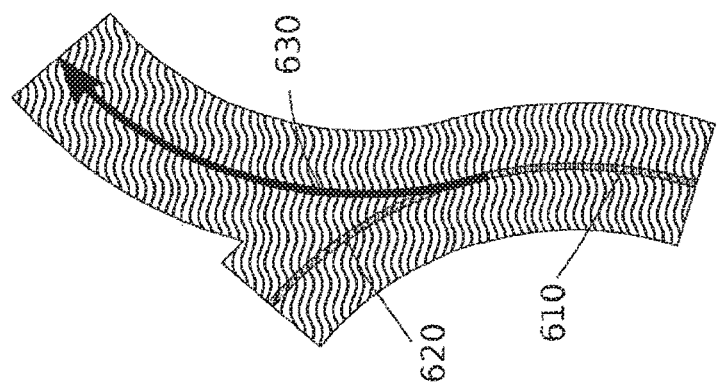
Figure 6B:
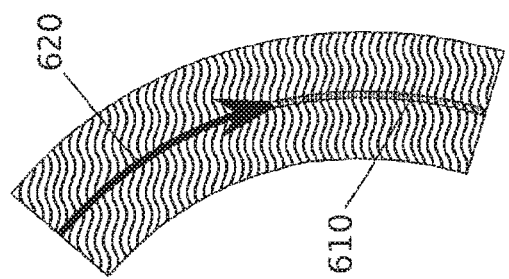
Figure 6A:
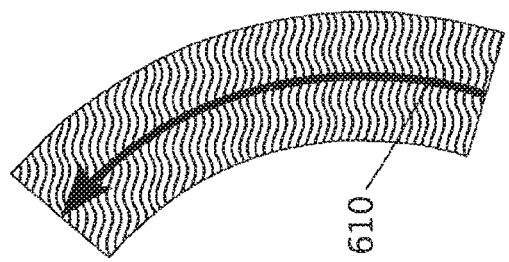

Illustrated in FIG. 5 is another example of a second trajectory for scrubbing a floor. The trajectory is produced by repetition of the sequence of steps shown in FIGS. 6A-6D. The solid line 510 represents the path traced by the midpoint of the leading edge of the cleaning assembly 120 while the shaded region 520 represents the region of floor scrubbed by the cleaning assembly. When this sequence is employed, the robotic cleaner oscillates in the forward direction of motion as well as laterally. For each oscillation, the forward displacement ("fwd_height") exceeds the backward displacement ("back_height") so the robot advances in a generally forward direction ("direction of progression"). The robot also moves left and right equal amounts (fwd_width) which causes the robot to travel in a generally straight line.

The trajectory shown ion trajectory in FIG. 5 is produced by repetition of the sequence of steps illustrated in FIG. 6A-6D. Each step or leg comprises a motion with an arcuate path. The first leg 610 of the sequence shown in FIG. 6A advances the robot forward by fwd_height and to the left with a predetermined radius. In the second leg 620 shown in FIG. 4B, the robot moves backward by back_height and to the right along the same radius as leg 610. In the third leg 630 shown in FIG. 6C, the robot moves forward by fwd_height and to the right with the same predetermined radius. In the fourth leg 640 shown in FIG. 6D, the robot moves backward by back_height and to the left with the same radius as above. The forward arcing motions progress a greater distance than the back motions so that the robot generally progresses in the forward direction.

For the trajectory shown in FIGS. 5 and 6A-6D, the parameters are as follows:

(a) fwd_height: the distance traveled in the direction of progression on the forward legs or strokes has a value of approximately 1.5 times with width of the cleaning assembly 120, namely the direction perpendicular to the direction of progression;

(b) back_height: the distance traveled in the direction opposite the direction of progression on the backward legs or strokes has a value of approximately 0.75 times the width of the cleaning assembly 120; and (c) radius: the radius of each arc is approximately equal to the diameter of the mobile robot, although the radius may range between 0.5 and 3 times the width of the cleaning assembly.

Figure 7:
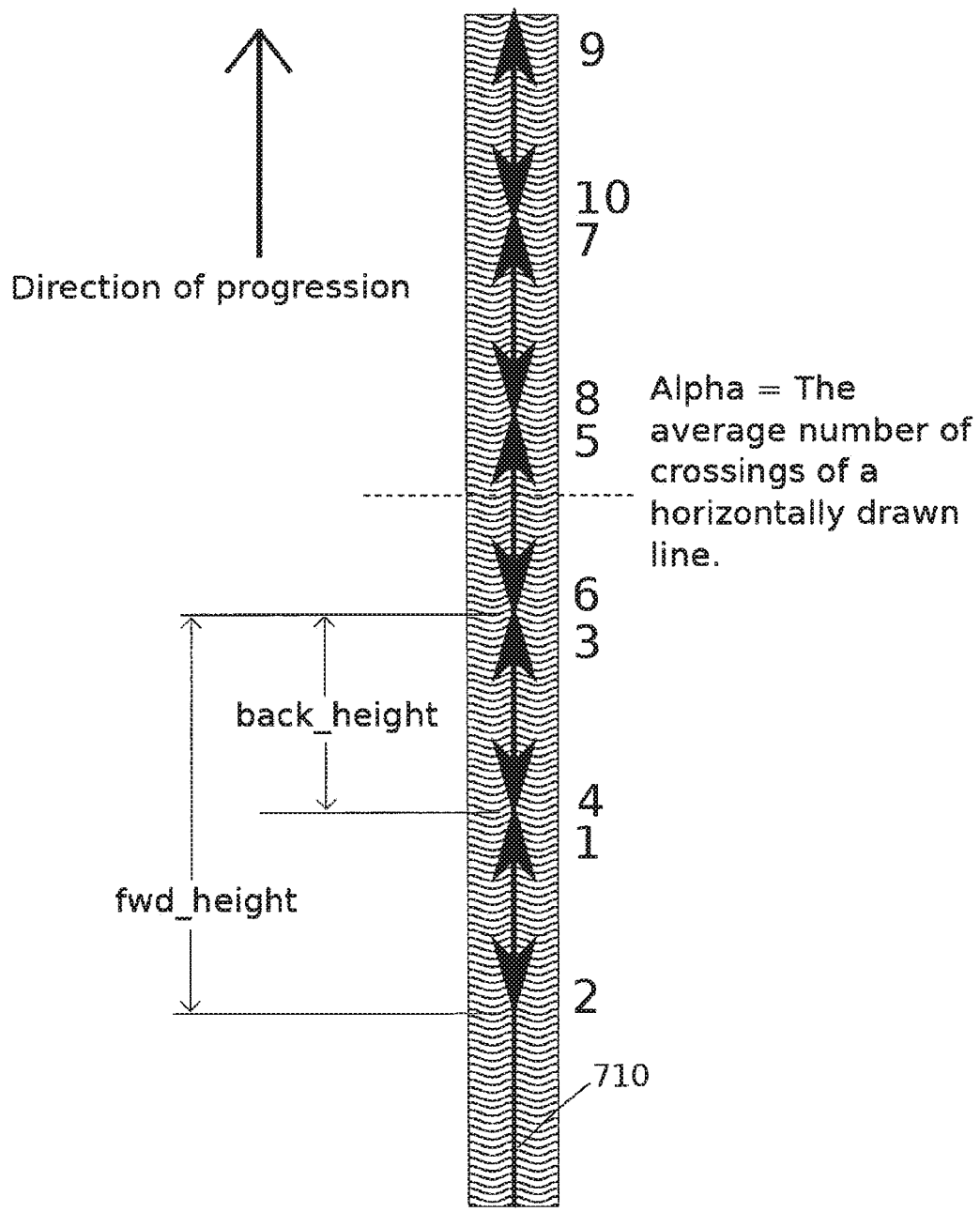
FIG. 7 is a cleaning trajectory for scrubbing a floor, in accordance with still another exemplary embodiment.

Illustrated in FIG. 7 is another example of a second trajectory for scrubbing a floor. The trajectory is produced by repetition of two legs that are both straight and parallel, as shown in FIGS. 7A-7B. The solid line 710 represents the path traced by the midpoint of the leading edge of the cleaning assembly 120 while the shaded region 720 represents the region of floor scrubbed by the cleaning assembly. When this sequence is employed, the robotic cleaner oscillates in the forward direction but not laterally. For each oscillation, the forward displacement ("fwd_height") of the forward leg 810 exceeds the backward displacement ("back_height") of the back leg 820, so the robot advances in a generally forward direction.

In some embodiments, the robot further includes a bump sensor for detecting walls and other obstacles. When a wall is detected, the robot is configured to make a U-turn by completing a 180 degree rotation while moving the robot to one side, the distance moved being approximately equal to the width of the cleaning assembly. After completing the turn, the robot is then driven across the room along a row parallel with and adjacent to the preceding row traversed. By repeating this maneuver each time a wall is encountered, the robot is made to traverse a trajectory that takes the robot across each portion of the room.

The trajectory is preferably based, in part, on the pose of the robot which is tracked over time to ensure that the robot traverses a different section of the floor with each pass, thereby avoiding areas of the floor that have already been cleaned while there are areas still left to be cleaned.

One or more of the components of the mobile robot, including the navigation system, may be implemented in hardware, software, firmware, or any combination thereof. Software may be stored in memory as machine-readable instructions or code, or used to configure one or more processors, chips, or computers for purposes of executing the steps of the present invention. Memory includes hard drives, solid state memory, optical storage means including compact discs, and all other forms of volatile and non-volatile memory.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A mobile robot configured to clean a space, the mobile robot comprising:
a cleaning assembly;
a drive system configured to move the mobile robot; and
a navigation system comprising one or more processors for executing instructions to control the drive system in accordance with a cleaning trajectory comprising a sequence in which the drive system:
moves the mobile robot in a forward direction and a first lateral direction along a first path from a first position of the mobile robot, the first path extending from the first position to an end of the first path;
moves the mobile robot in a backward direction and a second lateral direction along a second path from the end of the first path, the second path extending from the end of the first path to an end of the second path, and the second lateral direction being opposite the first lateral direction;
moves the mobile robot in the forward direction and the second lateral direction along a third path from the end of the second path, the third path extending from the end of the second path to an end of the third path; and
moves the mobile robot in the backward direction and the first lateral direction along a fourth path from the end of the third path, the fourth path extending from the end of the third path to a second position, wherein the second position is longitudinally forward of the first position.

2. The mobile robot of claim 1, wherein the navigation system is further configured to control the drive system to move the mobile robot in accordance with the cleaning trajectory comprising the sequence such that the drive system:
moves the mobile robot in the first lateral direction along the first path a first distance to the right, and
move the mobile robot in the second lateral direction along the third path a second distance to the left,
wherein the first distance to the right and the second distance to the left are less than a width of the cleaning assembly.

3. The mobile robot of claim 1, wherein the navigation system is further configured to control the drive system to move the mobile robot in accordance with the cleaning trajectory comprising the sequence such that the drive system:
moves the mobile robot along an arcuate trajectory along each of the first path, second path, third path, and fourth path.

4. The mobile robot of claim 3, further comprising:
a gyroscope configured to detect rotation of the mobile robot,
wherein the navigation system is configured to detect slippage of wheels of the drive system based on the rotation detected by the gyroscope.

5. The mobile robot of claim 1, wherein the navigation system is further configured to control the drive system to move the mobile robot in accordance with the cleaning trajectory comprising the sequence such that the drive system:
moves the mobile robot along the first path a first distance in the forward direction, and
moves the mobile robot along at least one of the second path or the fourth path a second distance in the backward direction,
wherein the first distance in the forward direction is no more than twice the second distance in the backward direction.

6. The mobile robot of claim 5, wherein the navigation system to control the drive system to move the mobile robot in accordance with the cleaning trajectory comprising the sequence such that the first distance in the forward direction is between one to five times a width of the cleaning assembly.

7. The mobile robot of claim 5, wherein the navigation system is further configured to control the drive system to move the mobile robot in accordance with the cleaning trajectory comprising the sequence such that the second distance in the backward direction is between one-third to four times a width of the cleaning assembly.

8. The mobile robot of claim 1, wherein the navigation system is further configured to control the drive system to move the mobile robot in accordance with the cleaning trajectory comprising the sequence in which the drive system moves the mobile robot along the first path, the second path, the third path, and fourth path such that the second position is forward of the first position in a direction of progression, and the direction of progression is parallel to the forward direction in the first position of the mobile robot and the second position of the mobile robot.

9. The mobile robot of claim 1, wherein the cleaning assembly is configured to detachably receive a cleaning sheet.

10. The mobile robot of claim 9, wherein the cleaning sheet is a wet sheet comprising a cleaning solution.

11. The mobile robot of claim 9, further comprising a cleaning solution dispenser configured to dispense cleaning solution from the mobile robot onto a floor surface.

12. The mobile robot of claim 9, wherein the cleaning assembly is configured to detachably receive the cleaning sheet by detachably receiving the cleaning sheet along a forward portion of the mobile robot.

13. The mobile robot of claim 1, wherein the sequence is a first sequence, and
the navigation system is further configured to control the drive system to move the mobile robot in accordance with the cleaning trajectory comprising the first sequence such that the cleaning trajectory comprises a second sequence in which the drive system
moves the mobile robot in the forward direction and the first lateral direction along a fifth path from the second position of the mobile robot, the fifth path extending from the second position to an end of the fifth path;
moves the mobile robot in the backward direction and the second lateral direction along a sixth path, the sixth path extending from the end of the fifth path to an end of the sixth path;
moves the mobile robot in the forward direction and the second lateral direction along a seventh path from the end of the sixth path, the seventh path extending from the end of the sixth path to an end of the seventh path; and
moves the mobile robot in the backward direction and the first lateral direction along an eighth path from the end of the seventh path, the eighth path extending from the end of the seventh path to a third position, wherein the third position is longitudinally forward of the second position.

14. The mobile robot of claim 1, wherein the navigation system is further configured to control the drive system to move the mobile robot in accordance with the cleaning trajectory comprising the sequence such that the drive system:
   moves the mobile robot along the first path by moving the mobile robot along a portion of a floor surface, and
   moves the mobile robot along the second path by moving the mobile robot along the portion of the floor surface.

15. The mobile robot of claim 1, wherein the navigation system is configured to determine a position and orientation of the mobile robot, wherein the navigation system is further configured to control the drive system to move the mobile robot in accordance with the cleaning trajectory comprising the sequence until each traversable section of a floor has been traversed by the mobile robot.

16. The mobile robot of claim 1, wherein the navigation system is further configured to control the drive system to move the mobile robot in accordance with the cleaning trajectory comprising the sequence such that the cleaning trajectory is completed in a duration of time between 5 and 60 seconds.

17. The mobile robot of claim 1, wherein the navigation system is further configured to control the drive system to move the mobile robot in accordance with the cleaning trajectory comprising the sequence such that the cleaning trajectory is completed in a duration of time between 15 and 30 seconds.

18. The mobile robot of claim 1, wherein the navigation system is further configured to control the drive system to move the mobile robot in accordance with the cleaning trajectory comprising the sequence such that the drive system
   moves the mobile robot along the first path a first distance in the forward direction, and
   moves the mobile robot along the third path a second distance in the forward direction, the second distance in the forward direction being substantially equal to the first distance in the forward direction.

19. The mobile robot of claim 18, wherein the navigation system is further configured to control the drive system to move the mobile robot in accordance with the cleaning trajectory comprising the sequence such that the drive system
   moves the mobile robot along the second path a first distance in the backward direction, and
   moves the mobile robot along the fourth path a second distance in the backward direction, the first distance in the backward direction being substantially equal to the second distance in the backward direction, and the first distance in the backward direction and the second distance in the backward direction being less than the first distance in the forward direction and the second distance in the forward direction.

* * * * *